United States Patent [19]

Elias et al.

[11] Patent Number: 4,915,986

[45] Date of Patent: Apr. 10, 1990

[54] OPTICAL LENS TINTING MACHINE

[76] Inventors: Tariq J. Elias; Hani E. Chika, both of 4521 Park Blvd., San Diego, Calif. 92116

[21] Appl. No.: 165,235

[22] Filed: Mar. 7, 1988

[51] Int. Cl.⁴ .......................... B05D 5/06; B05C 11/00
[52] U.S. Cl. ........................................ 427/164; 8/507; 118/425; 118/697; 118/699; 118/705; 427/169; 427/430.1
[58] Field of Search ...................... 427/164, 169, 430.1; 118/425, 699, 702, 697, 705; 8/507

[56] References Cited

U.S. PATENT DOCUMENTS 4,455,322 6/1984 Weber .................................. 427/169
4,476,162 10/1984 Ireland ................................ 427/169

FOREIGN PATENT DOCUMENTS 0097064 8/1978 Japan ...................................... 8/507
0140378 8/1978 Japan ...................................... 8/507
0140380 8/1978 Japan ...................................... 8/507

Primary Examiner—Janyce Bell
Attorney, Agent, or Firm—Ralph S. Branscomb

[57] ABSTRACT

An eyeglass lens tinting machine which utilizes a microprocessor-controlled stepping motor to carefully control the vertical oscillations of a support structure including a vertical shaft which mounts a horizontal boom which in turn supports an eyeglass lens holder. The lens holder is moved directly up and down (with substantially no horizontal components of movement) by the mechanism. The base which mounts the vertically sliding shaft which supports the boom also mounts the stepping motor and printed circuit board with the microprocessor controller on it. The tinting machine has two basic modes of operation, the solid tint mode in which the lens is lowered beneath the surface of dye in a dye vat and reciprocated completely immersed for a pre-set period of time to create an even, uniform tint. The other mode is a gradient tint mode which is achieved by lowering the top portions of the eyeglass lenses into the dye vat to the line at which the gradient starts, subsequent to which the machine will simultaneously reciprocate the lenses up and down and slowly withdraw them from the dye so that they are moving vertically at all times, and are being withdrawn from the dye so that upper portions of the lens are immersed for longer periods of time, thus creating a smooth, even gradient.

9 Claims, 5 Drawing Sheets

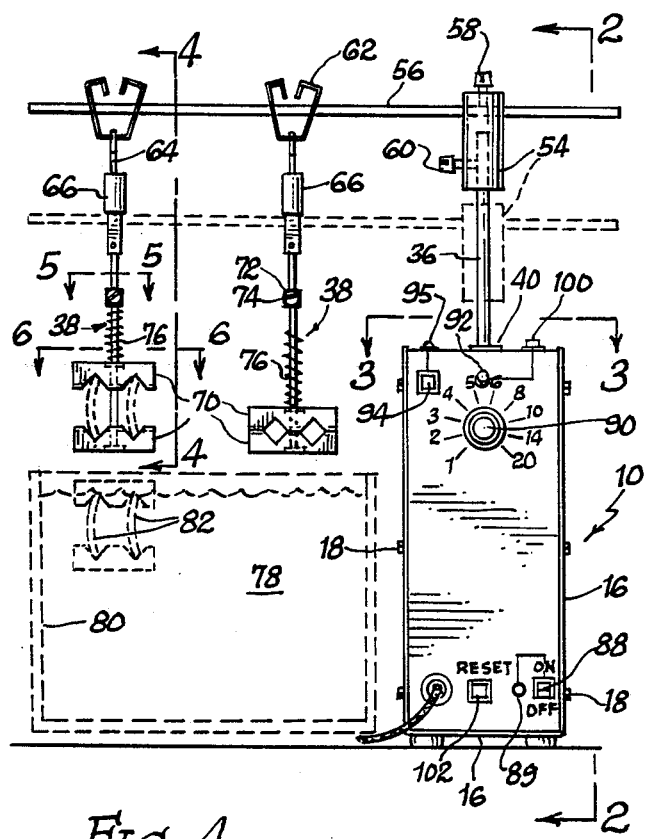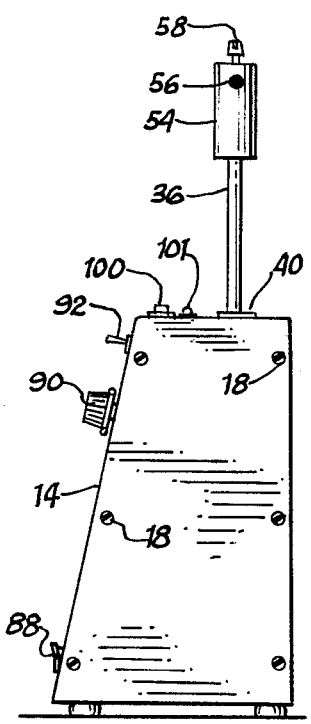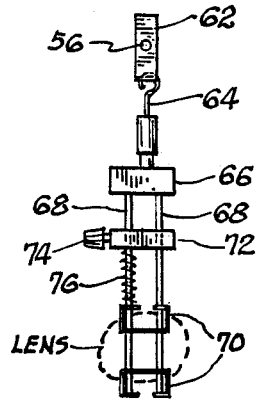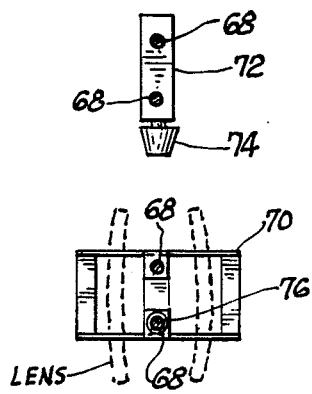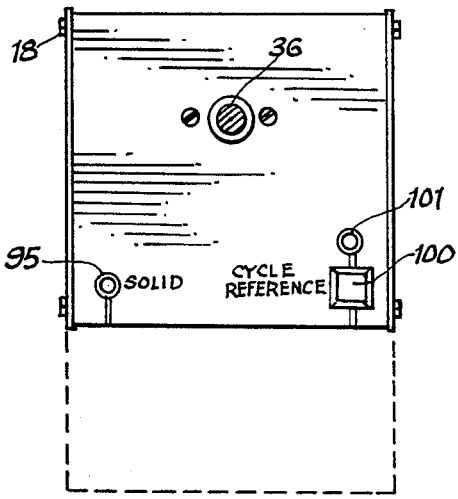

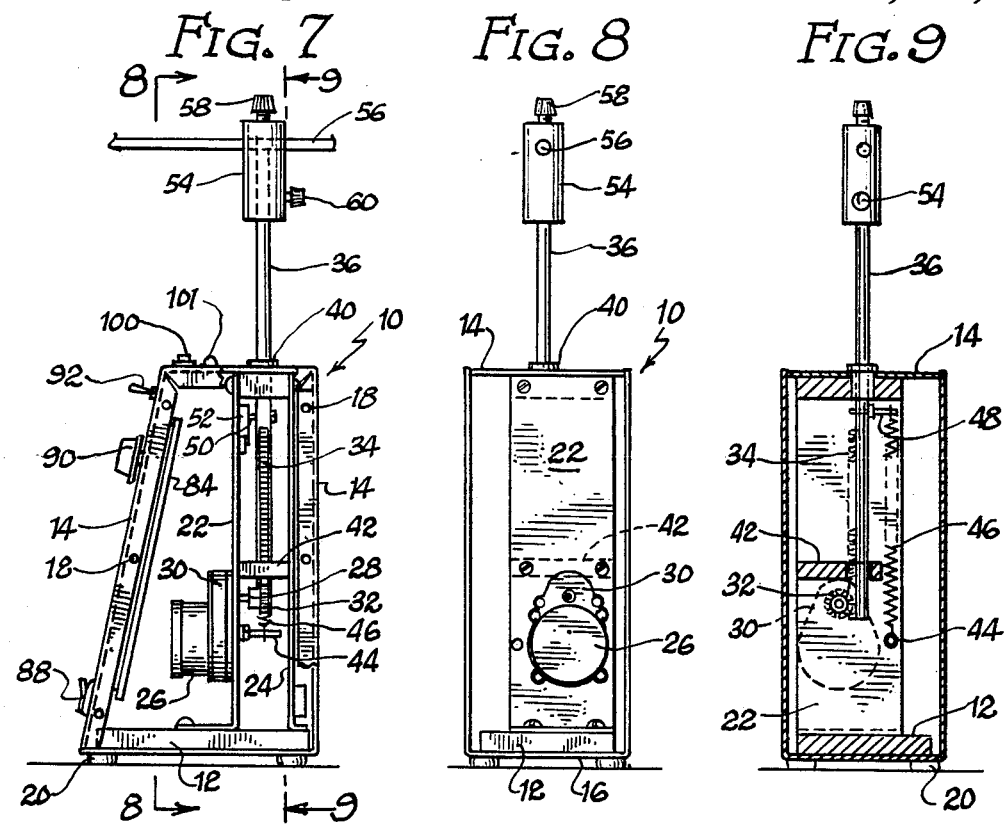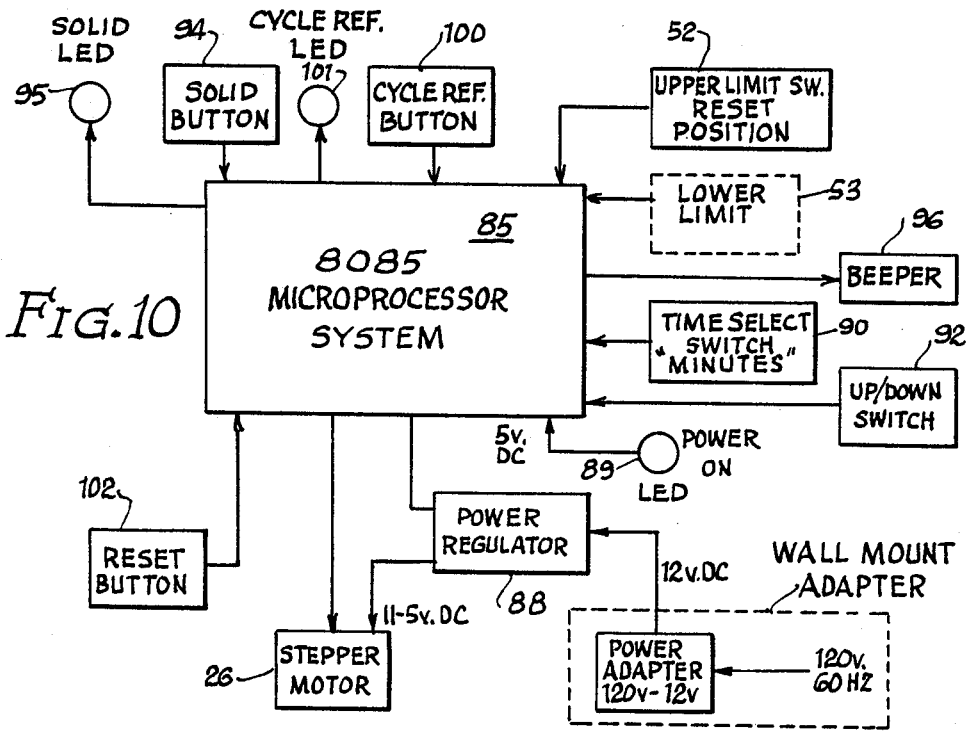

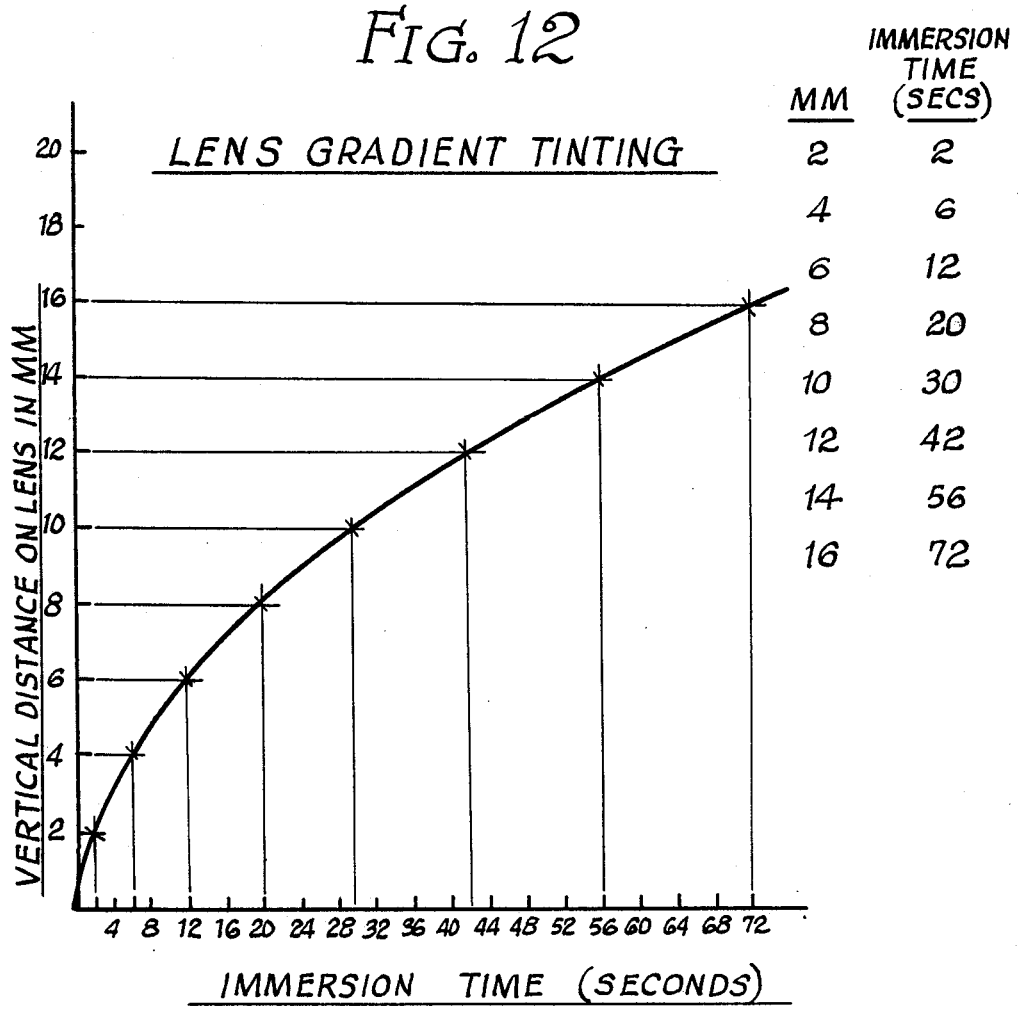

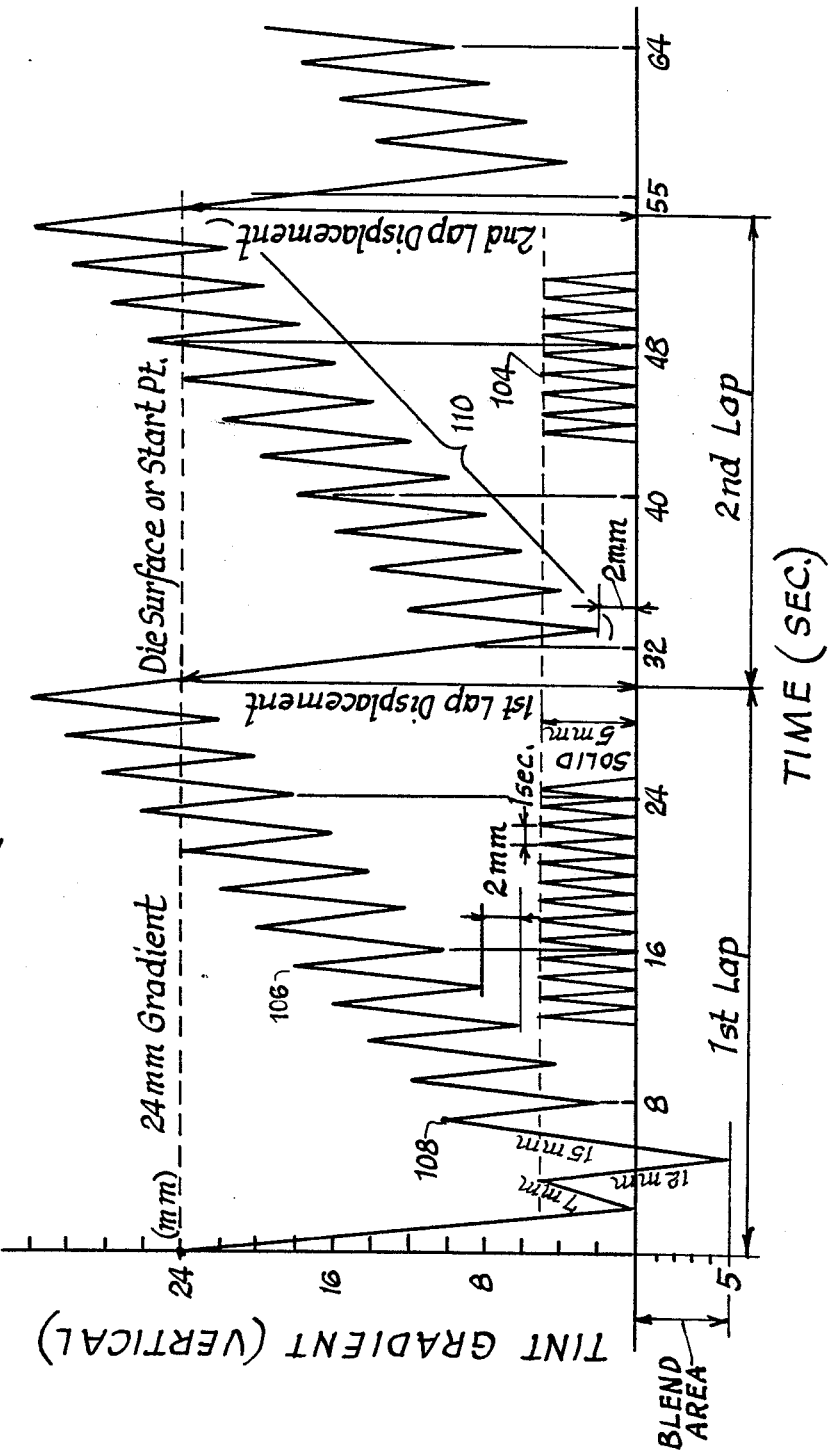

OPTICAL LENS TINTING MACHINE

BACKGROUND OF THE INVENTION

The instant invention is in the field of eyeglass tinting machines which are used to make either a solid or a gradient tint on prescription eyeglass lenses, generally plastic lenses.

Immersion of the eyeglass lenses completely into the dye solution in a dye vat for a period of time will produce a solid tint, the color density of which is a function of the immersion time. Another type of tint, called the gradient tint, begins with a clear lens (at the bottom), and then gradually increases in color density toward the top where the density is the greatest. As with solid tints, the density of gradient tints is a function of immersion time.

However, the relationship between density and immersion time is non-linear because the lenses absorb faster at the beginning of their tinting cycle than at the end. Because of this nonlinearity, creating a good gradient tint was once a problem. At one time an even gradient could only be achieved by manual immersion. Thereafter, simple machines were developed to produce gradient tints, but these machines were not very efficient or effective until in recent years, in which manufacturers began incorporating microprocessors into the systems to more carefully control the dipping action.

These systems typically have a fairly complicated set of controls with a keyboard and a digital read-out. The keyboard must be used to enter the depth of the gradient in millimeters, and other parameters require digital entry in order to operate the machine.

Even beyond the relative complexity of operation of these machines, they still tended to make blotchy and streaked lenses, particularly when making a gradient tint. If the lenses are stationary in the hot dye in which they are tinted for any length of time, unless they are complete immersed, there will be a line or streak at the dye water line. When such streaks are made, the operator will then try to bleach them out by dipping them in a bleach solution, and then re-dye them to darken them up again. Not only is this tedious, but also ineffective as the streaks are generally not ever completely removed.

In addition to streaks caused in this manner, blotching, smeared, and streaked appearances of the tinted lenses is also caused by the non-uniform nature of the solution of dye. The non-uniformity takes two forms. First, the dye density varies somewhat at a very local level, so that certain places of the lenses may be darker than other because they were exposed to higher color density zones in the dye. Typically, the dye is a "dispersible" which will tend to settle out of dispersion if left still, rather than being a completely soluble solution. Additionally, because the dye is typically heated from the bottom and sides, there is a circulation caused by the heating which also helps make the heat uniform within the vat of dye. Nonetheless, the mere fact that there is circulation is evidence that some areas are hotter than others, and the hotter the dye is, the faster it is to "take" on the lens.

For these reasons, a lens, whether it be tinted solid or with a gradient, will not have a uniform appearance or an even gradient appearance, as the case may be, if it immersed in the dye partially or wholly and left stationary for any period of time. It must be continually in motion to both stir the dye right at the surface of the lenses, and expose the surfaces of the lenses to continuously changing portions of the dye to even out absorption disparity caused by temperature gradient or color density gradient within the dye itself.

SUMMARY OF THE INVENTION

The instant invention resolves the above-stated problems. Its controls are the essence of simplicity, there being only an up/down switch, two push buttons to begin the solid tint or gradient cycle, respectively, and a timer knob which determines the length the lenses are immersed in the dye. There is no digital read-out required, nor is there a keyboard entry. All necessary commands can be entered into the machine through these four simple inputs, plus a reset button and a basic on/off switch.

Additionally, the two cycles of the machine, that for creating solid tints and the gradient tint, both cause the lenses to continually reciprocate in the dye solution so that no streaks or blotches are formed. This is one of the major advantages of the instant invention.

The horizontal boom, which moves vertically, can suspend up to four lens holders so that up to four pairs of lenses can be dyed at once. The boom is also easily pivotable in the horizontal plane about the vertical axis which mounts it so that whatever orientation is most convenient can be easily achieved. This distinguishes over some machines which have no angular adjustability of this type, and which incorporate both the functions of the vertical shaft and the horizontal boom in a single angular arm which pivots up and down so that both horizontal and vertical components are contained within the movement of lens holder, which is attached to the end of the arm.

BRIEF DESCRIPTION OF THE DRAWINGS

FIG. 1 is a front elevation view illustrating the tinting machine as it appears in use with a pair of lens holders;

FIG. 2 is a side elevation view as seen from line 2—2 of FIG. 1;

FIG. 3 is a horizontal section taken along line 3—3 of FIG. 1;

FIG. 4 is a vertical section taken along line 4—4 of FIG. 1;

FIG. 5 is a horizontal section taken along line 5—5 of FIG. 1;

FIG. 6 is a horizontal section taken along line 6—6 of FIG. 1;

FIG. 7 is a side elevation view of the machine with the side panels removed so the inside mechanism is visible;

FIG. 8 is a section taken along line 8—8 of FIG. 7;

FIG. 9 is a section taken along line 9—9 of FIG. 7;

FIG. 10 is a schematic block diagram of the machine;

FIG. 12 is an empirically derived graph illustrating the ideal immersion time at different levels of a gradient tint lens; and, FIG. 13 illustrates the cycling of the machine in the solid mode and in the gradient mode in graph form as vertical distance plotted against time.

DETAILED DESCRIPTION OF THE PREFERRED EMBODIMENT

Figure 11:
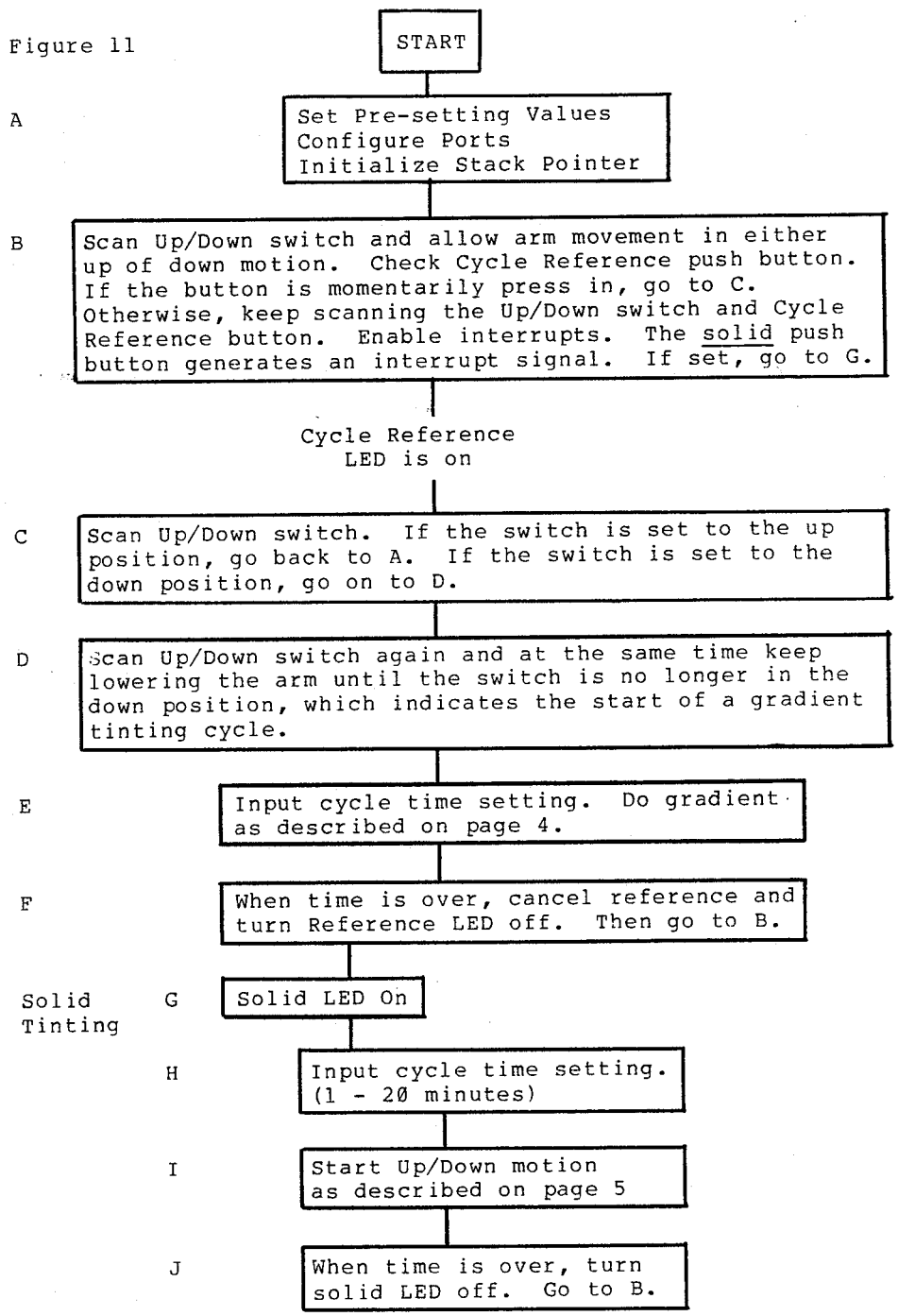
FIG. 11 is a software block diagram indicating the organization of the microprocessor.

The machine has a large base 10 which consists of a relatively heavy half-inch thick metal slab 12 and a front-to-rear sheet metal wrap-around 14, and side- and bottom-wrap-around sheet 16 which is screwed to the front-to-rear sheet at 18, and screwed to the bottom slab through the footpads 20, so that the entire base is, in essence, comprised of the bottom weighting and mounting slab 12 and two bent, formed sheet metal sections.

Front and rear mounting plates 22 and 24 are screwed to the slab 12 and the top of the metal sheet 14, and mount the interior structure of the base. Stepping motor 26 mounts to the plate 22 and its drive shaft 28, which actually extends from the gear reduction box 30, passes through the plate 22 and mounts a pinion gear 32. The pinion gear drives the stainless steel rack 34 of the vertical shaft 36 of the support means for the lens holders 38. The vertical shaft 36 is slidably mounted between an upper bushing 40 mounted in the sheet 14 and a ceramic positioning block 42 which is mounted between plates 22 and 24.

A bolt 44 extends through the plate 22 and engages the lower end of an extension spring 46, the top end of which engages a bolt 48 extending from the vertical shaft so that there is a constant downward tension on the shaft. Another bolt 50 passes through the upper portion of the vertical shaft and actuates the limit switch 52 when the vertical shaft has traveled to its uppermost limit.

At the top of the vertical shaft 36 is a cylindrical block 54 which mounts a transverse boom 56 by the use of appropriate bores in the cylindrical block, and set screws 58 and 60. Clearly, set screw 58 controls the level of horizontal extension of the boom, and set screw 60, when loose, prevents the unimpeded swinging of the boom 56 about the vertical shaft as its axis, so that the boom has 360 degree about-the-vertical-axis adjustability. Once in the appropriate position, it is tightened down with set screw 60.

The boom extends to the side as shown in FIG. 1 and can be used to suspend up to four of the lens holders 38, two of which are shown. A frictional clip 2 expands on the boom to engage it such that there is no axial sliding of the clip on the boom, and then the lens holder hooks into the bottom of the clip as shown in FIG. 4. The lens holder includes the hook 64 which is mounted in a ceramic block 66 with a cylindrical upward extension to mount the hook, the lower portion of the block mounting the inserted ends of the rods 68. The rods mount identical but mutually inverted lens holding pieces 70, the lower of which is fixedly mounted and the upper of which slides along the rods 68. The adjustable tensioning bar 72 also rides up and down the rods 68 and can be fixed at any position with the set screw 74. A compression spring 76 on one of the rods between the tensioning bar 72 and the uppermost of the lens holding pieces maintains a compressive force between the two lens holding pieces to securely hold the lenses in position while they are being tinted. As shown in FIG. 1, the lenses are lowered in the lens holder on the boom 56 into the dye 78 in the vat 80.

From this description, thus far it can be seen, by reference to FIGS. 1, 7 and 9, that as the stepping motor 26 moves in one direction or the other, the pinion gear 32 will drive the rack 34 up and down, driving the vertical shaft 36 up and down, which through the lens holder support means comprising the vertical shaft and the transverse boom 56, raises and lowers the lenses 82 relative to, and in and out of, the dye 78 in the vat 80.

Turning now to the control means for the motor, as can be seen in FIG. 7, a printed circuit board 84 is mounted to the inside of the front plate of the front-to-rear wrap around sheet metal cover 14. The PC board mounts an Intel 8085 microprocessor and interfacing circuitry using TTL integrated circuits. The microprocessor and the interfacing IC's are indicated at 85 in FIG. 10. The rest of the controls are best understood in a description of the operation of the apparatus.

OPERATION

In operation, the power is turned on at switch 88, and is indicated as being on by LED 89, indicated in FIG. 10.

Once the power is on, the length of time that the lens is to be immersed in the dye is selected with the timer 90. The timer of the production unit can be set at one minute increments between one minute and 20 minutes. It is not the type of timer in which this setting knob winds down.

When the timer is set, if the lenses to be tinted are to have a solid tint, the up/stop/down switch 92 is pressed into the down position and held there until the lenses are sufficiently beneath the surface of the dye 78. Once in position, the operator pushes the button 94, which is the solid tint actuator button. The LED 95 indicates that this actuator button is on and the unit is in the solid tint mode.

Once the "solid" actuator button has been pressed, the lenses on the lens holder will oscillate up and down with five millimeter strokes as indicated in FIG. 13, until the time set on the timer is reached, at which time the vertical shaft 36 is raised and the lenses are automatically lifted up to the uppermost position of the mechanism, at which point a beeper 96 beeps five times to indicate the uppermost position has been reached. Any time during any cycle when the switch 94 is pushed into the up position, the cycle is interrupted and the mechanism will remove the lenses from the dye just as though the timer had come to the end of its cycle, and the beeper will again sound five beeps. The limit switch 52 actuates the beeper and also deactivates the motor 26, as the shaft has reached the uppermost limit to which it is designed to move.

If a gradient tint is desired, the following process is followed. When the lenses are in the lens holders upside-down, the "down" toggle is depressed and lenses are brought down until the lowermost edges touch, or almost touch, the dye line, and the "Cycle Reference" button 100 is pressed, and its "on" status is indicated by the LED 101. At this point, the computer makes note that the lens edges are at the dye surface. In fact, the "Cycle Reference" button cannot be depressed until the lenses have been lowered from their uppermost position at least ten millimeters, because the computer "knows" that before this, the operator is making an error, inasmuch as the lens edges could not possibly be at the dye surface yet.

To start the actual tinting cycle, once the "Cycle Reference" button 100 has been depressed to light the LED 101, the up/stop/down toggle must be depressed and held down until the lenses move into the dye 78 to the point where the water level of the dye vat is a the level across the lenses where the tint is to start. Once this level is reached, the operator releases the switch 94, which automatically (as always) snaps into the "stop," central position, and the machine automatically goes into its gradient tint cycle in which the lenses are reciprocated up and down and gradually removed from the dye, then reinserted in one stroke and gradually removed again in short, reciprocating strokes as graphed in FIG. 13, and so forth until the time set on the cycle switch 90 is up.

Several features of the microprocessor system are important. A detailed flow chart is set forth in FIG. 11. First, the system "knows" where the lens is relative to the dye at all times. When the upper limit switch 52 is actuated, the microprocessor makes a note of it. It knows exactly where the lens is relative to the tinting machine, and approximately where the lens is relative to the dye level, especially if the user is using the same dye vats manufactured by the manufacturers of this tinting machine.

As indicated above, as the lens is moved down by depressing the toggle, in the gradient tint mode it is stopped just above, or at, the dye surface, and at this point the "Cycle Reference" button is pushed, which inputs to the microprocessor the "Cycle Reference" level so the microprocessor now knows where the liquid surface is. With these two pieces of information, the microprocessor executes at least three tasks. First, as indicated above, the cycle reference button cannot be set until the lens has been lowered at least ten millimeters from the uppermost limit switch position to ensure the lenses have been lowered to dye level. Secondly, once the "Cycle Reference" button has been pushed, indicating the lens is at the dye line, on further lowering the lens, the system will not go into the gradient tint cycle until the lens has been further lowered a pre-set minimum amount to ensure the lenses will have at least a minimum gradient band. These two minimums help to prevent operator accidents by making it impossible to operate the machine in two instances in which a clear error has been made.

Lastly, the machine does not have a lower limit switch per se, but the software equivalent, indicated at 53 in FIG. 10, is achieved by virtue of the machine keeping track of where it is and stopping the boom when it reaches what the machine knows is its lower limit.

The remaining control on the machine is the reset button 102. The reset button, like any reset button, interrupts whatever cycle the machine is in, removes the lenses from the dye if they are in the dye, and moves the boom to its uppermost position. Pushing the reset button is similar, if not the absolute equivalent, of pushing the switch 94 into the up position during a cycle. Another function of the microprocessor is to disable all functions of the machine when it is in a tinting cycle, except the "up" toggle and the reset button. Once the cycle has started, no further actuation of the "Cycle Reference" button, the timer knob, or the solid button has any effect. Again, this is a fool-proof feature of the mechanism.

The actual movement of the lenses in the dye as effectuated by the machine is quite important. In the case of the solid tint, FIG. 13 illustrates a sawtooth line 104, indicative of the fact that the lenses merely move up and down and up and down in five millimeter strokes in the solid tint mode.

The gradient tint mode is much more complex and is indicated by the graph line 106 in FIG. 13. When the lens is moved down into its starting position after the cycle reference switch has been pressed, when the down toggle is released the cycle is started with an up motion of seven millimeters, a down motion of 12 millimeters, and then an up motion of 15 millimeters so that at the point 108 the starting point on the lens for the gradient is 10 millimeters above the dye level. This initial triple stroke is done to create a "blending" area.

Subsequently, the machine begins a uniform sawtooth pattern of moving down eight millimeters and then up ten millimeters, down eight millimeters and up ten as indicated, to complete a "lap" 110, subsequent to which another similar lap is started (without the three initial strokes), except that the subsequent lap is begun two millimeters higher than the previous one. Subsequent laps, as indicated in FIG. 10, will each be two millimeters higher than the prior lap. When several of the laps have been completed, each being two millimeters higher than the one before, a complete period has been completed, and the period begins all over again with an identical period. Each period ends when the lenses come completely out of the dye, which the microprocessor knows as a result of input of the "Cycle Reference" point data. This up and down motion superimposed on up and down motion, superimposed on yet another up and down motion, continues to repeat at the end of each period until the time set on the timer expires.

The degree of tint is a non-linear function of time. It is also a function of the lens material. Soft material lenses will absorb at a much greater rate than lenses made from a very hard, non-absorbing plastic.

From long experience tinting lenses, the inventors have determined the tint density from the point where the tint starts to the densest portion, and have translated this into a function of immersion time as indicated in FIG. 12. The curve of FIG. 12 represents the color density in a well tinted lens. The immersion times for each lens level as determined from FIG. 12 have been translated by the inventors into the linear motion of FIG. 13, which results in a gradient similar to that shown in the curve of FIG. 12. It should be emphasized that FIG. 12 represents empirical data taken from actual measurements and experiments tinting lenses, and that this empirical data has been translated into the software to produce a gradient like that shown in FIG. 12 by using the reciprocating linear motion of FIG. 13.

The results of the lens tinting machine are extremely uniformly tinted lenses. The solidly tinted lenses are quite uniform and nice, but the real crowning glory of the machine is its ability to produce gradient lenses that are perfect as best the eye can see. There are no streaks, lines or blotches, and as one moves from the clear lower portion of the lens into the tinted area, it cannot even been discerned quite where the tint begins. The complete evenness of tint continues as the tint get darker and darker towards the top of the lens, with there being no line or point on the lens which would indicate any particular change in color density.

The feature of the beautiful, flawless product created by the machine, together with its simplicity of operation, puts it head and shoulders above its present competition. Having been introduced only recently into the marketplace, it is already making substantial inroads and should be the desired unit of replacement as older, less sophisticated units produced by other manufactures are out to pasture.

We claim:

1. An eye glass lens dipping machine for dipping lenses held in a lens holder at least partially into a vat of dye to tint the lenses, said machine comprising:
   a. a base;
   b. support means extending from said base for suspending said lens holder;

c. controlled motor means for causing said support means to move such that lenses in a lens holder suspended therefrom are at least partially dipped in dye in said vat of dye during an immersion stroke, and lifted out of the dye on an upstroke;

d. a microprocessor based controlled which controls said controlled motor means and causes same to continuously reciprocate said support means and lenses in a lens holder suspended thereby after said immersion stroke during a dye absorbing cycle to stir the dye in said vat to prevent streaking and blotching from occurring on said lenses due to localized temperature and dye density gradients in said dye;

e. said dye absorbing cycle being a gradient tint cycle and said support means being caused by said controlled motor means controlled by said microprocessor based controller to reciprocate said lens holder alternately up and down with the up distance greater than the down distance greater than the down distance so that up-side down lenses held in said lens holder have their upper regions immersed in the dye longer than the lower regions to create a gradient tint;

f. said gradient tint cycle comprising a plurality of identical repeated periods with each period comprising a series of laps with each lap in each period being substantially similar to the prior lap except that the lenses being the respective lap higher in the dye than they did in the prior lap; and g. said microprocessor based controller being programmed to drive said controlled motor means such that when said gradient tint cycle is graphed with its instantaneous vertical positioned plotted against time, each period results in a sawtooth superimposed on a sawtooth.

2. A machine according to claim 1 wherein the smallest teeth of the sawtooth have substantially ten millimeter rises and substantially eight millimeter falls.

3. A machine according to claim 2 wherein each period begins with the lens holder two millimeters higher than the previous period.

4. A machine according to claim 1 wherein said base mounts a selectable variable timer connected to said controller which terminates said gradient tint cycle, and said base mounts a down switch and a cycle reference switch, said microprocessor based controller is connected to said switches and is programmed such that lenses in said lens holder can be lowered by operating said down switch until the edges of the lenses touch the eye in the vat, with the Cycle Reference switch then being actuated and the lenses further lowered with a down switch until the intended beginning of the gradient tint on the lenses substantially aligns with the water level of the dye in the vat, and said down switch is then released, which then causes said lenses to begin the gradient tint cycle upon release of the down switch.

5. A machine according to claim 1 wherein said microprocessor based controller includes a switch-selectable solid tint cycle in which the lenses are immersed completely during a tinting cycle, and an alternatively switch-selectable gradient tint cycle, in which immersion time increases from the desired gradient line on the lenses to the upper edges of the lens.

6. A machine according to claim 4 wherein said controller is programmed such that regardless at which depth said lenses are initially immersed to define the gradient tint line for the respective lenses, each cycle period begins as soon as the lower edges of the lenses substantially reach the level of eye in said vat at the end of the previous period.

7. A method of producing a gradient tint in eyeglass lenses in a vat of dye comprising the following steps:

a. selecting a gradient tint cycle during which the gradient portion of said lenses will be submerged at least part of the time;

b. lowering said lenses until said lenses are immersed to the point at which the uppermost part of the lenses to be dyed is aligned with the surface of the edge in said vat;

c. imposing a vertical reciprocation on top of a reciprocation to achieve a cycle pattern comprising a series of diminishing laps each beginning at a lever higher than the previous lap, with each lap having continuous vertical reciprocations, and repeating said series of laps for a predetermined period of time such that when said gradient tint cycle is graphed with its instantaneous vertical position plotted against time, each period results in a sawtooth imposed on a sawtooth.

8. A method according to claim 6 wherein at the beginning of said cycle time said lenses are put through a special cycle of substantially seven millimeters up, 12 millimeters down, and 15 millimeters up to create a blending area.

9. A method of claim 7 wherein at the end of said special cycle, step (d) then comprises continuously reciprocating said lenses on the order of ten millimeters up and eight millimeters down.

* * * * *